United States Patent
Kogoi et al.

(10) Patent No.: US 6,416,862 B1
(45) Date of Patent: Jul. 9, 2002

(54) ULTRAFINE PARTICULATE ZINC OXIDE AND PRODUCTION PROCESS THEREOF

(75) Inventors: Hisao Kogoi, Tokyo; Jun Tanaka, Toyama; Hayato Yamaya, Tokyo, all of (JP)

(73) Assignee: Showa Denko K. K., Tokyo (JP)

( * ) Notice: Subject to any disclaimer, the term of this patent is extended or adjusted under 35 U.S.C. 154(b) by 0 days.

(21) Appl. No.: 09/645,354

(22) Filed: Aug. 25, 2000

Related U.S. Application Data

(60) Provisional application No. 60/215,071, filed on Jun. 30, 2000.

(30) Foreign Application Priority Data

Aug. 25, 1999 (JP) ............................................ 11-238873

(51) Int. Cl.[7] ................................................. B32B 5/16
(52) U.S. Cl. ...................... 428/402; 428/404; 423/623; 430/56; 430/60; 430/62; 252/519.53
(58) Field of Search ................................ 428/402, 404; 252/519.53; 423/623; 430/56, 60, 62

(56) References Cited

U.S. PATENT DOCUMENTS 5,560,871 A * 10/1996 Yoshimaru et al. .... 252/519.53
5,582,771 A * 12/1996 Yoshimaru ............. 252/519.53

FOREIGN PATENT DOCUMENTS

| JP | 60-5529 | * | 2/1985 |
| JP | 3-150299 | * | 6/1991 |
| JP | 4-349118 | * | 12/1992 |
| JP | 5-17143 | * | 1/1993 |
| JP | 6-144833 | * | 5/1994 |
| JP | 6-144834 | * | 5/1994 |
| JP | 7-118133 | * | 5/1995 |

OTHER PUBLICATIONS

"Formation of Needle–like Zinc Oxide Particles and the Analysis of Particle Morphology", Osamu Sakurai et al., Bulletin of Chemical Society of Japan, (1984), pp. 837–842.*

"Measuring Methods for the specific surface area of fine ceramic powders by gas absorption using the BET method" JIS R 1626–1996.*

* cited by examiner

*Primary Examiner*—Leszek Kiliman
(74) *Attorney, Agent, or Firm*—Sughrue Mion, PLLC

(57) ABSTRACT

Ultrafine particulates of highly white zinc oxide having a reduced average particle diameter of about 15 nm to about 55 nm as measured by the BET-one point method and that has an L value of about 90 or more as measured by a Hunter-type color-difference meter. Also, a process for producing ultrafine particulates of highly white zinc oxide, comprising oxidizing zinc vapor with an oxidizing gas in a reactor, wherein a zinc vapor-containing gas has a temperature of about 950° C. or more at a nozzle of the reactor for discharging the zinc vapor-containing gas and the oxidizing gas has a temperature of about 900° C. or more at a nozzle of the reactor for discharging the oxidizing gas is disclosed.

9 Claims, 1 Drawing Sheet

ULTRAFINE PARTICULATE ZINC OXIDE AND PRODUCTION PROCESS THEREOF

CROSS REFERENCE TO RELATED APPLICATIONS

Figure 1:
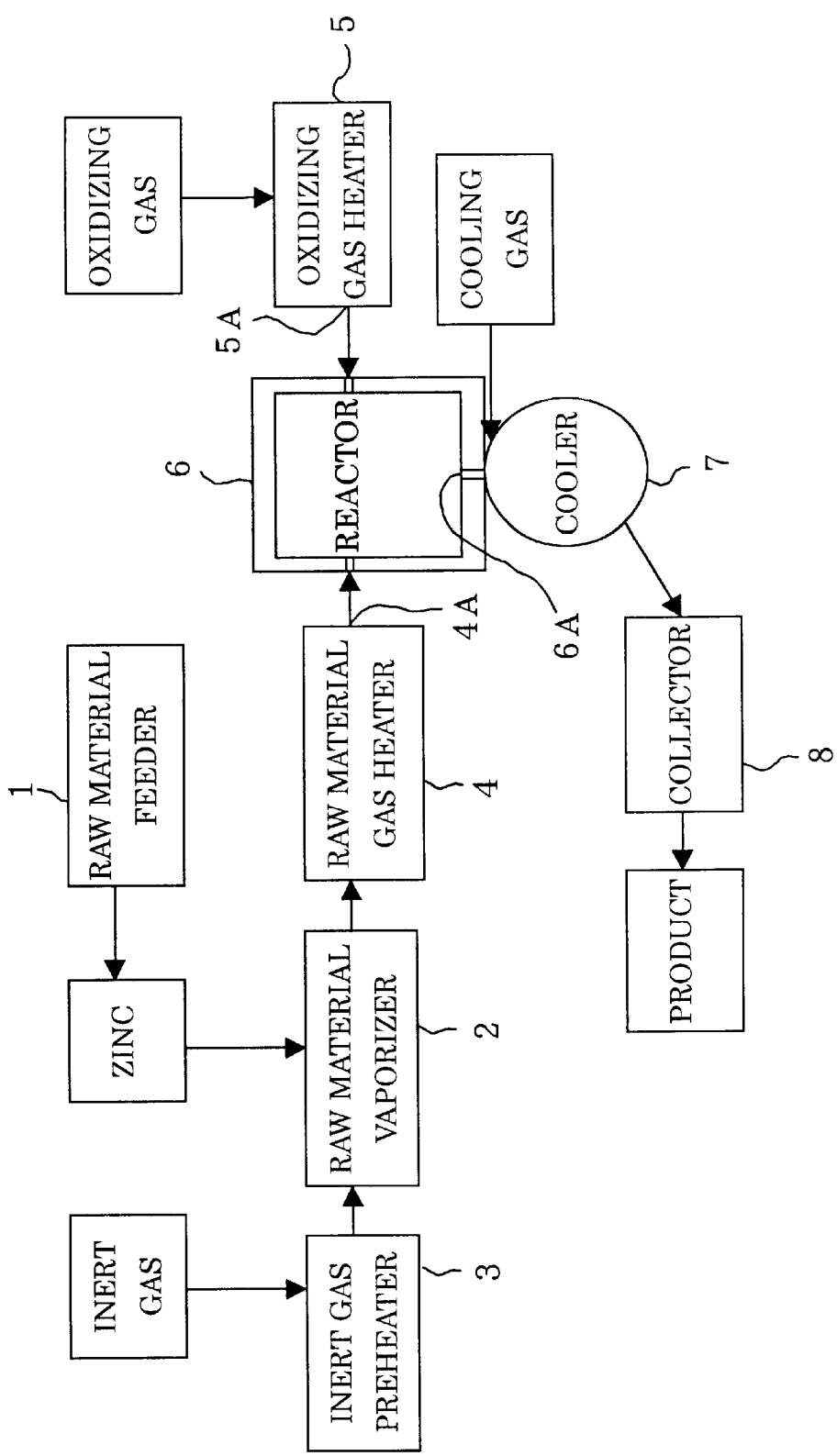

This application is based on the provisions of 35 U.S.C. Article 111(a) with claiming the benefit of filing date of U.S. provisional application Serial No. 60/215,071 filed on Jun. 30, 2000 under the provisions of 35 U.S.C. 111(b), pursuant to 35 U.S.C. Article 119(e) (1).

BACKGROUND OF THE INVENTION

1. Field of the Invention

The present invention relates to particulates, particularly ultrafine particulates of highly white zinc oxide, more particularly the one having a tetrapod- or needle-shaped particle configuration. Furthermore, the present invention relates to particulates, particularly ultrafine particulates of highly white zinc oxide obtained by flowing zinc vapor along with a carrier gas composed of an inert gas into a reactor, simultaneously flowing an oxidizing gas containing oxygen and steam into the reactor to oxidize the zinc vapor, and quickly cooling it and to a production process thereof. Here, although ultrafine particulates in general is not strictly defined with respect to the primary particle size, fine particles having a primary particle size of about 0.1 $\mu$m or less is usually called ultrafine particles (particulates).

2. Description of the Related Art

Zinc oxide has been used as a medicine, a vulcanization accelerator for rubbers, a catalyst, a material for electronic components, a paint, a pigment, a cosmetic, a reinforcing material for plastics or rubbers, etc. Generally, the production process for zinc oxide includes a liquid phase process and a vapor phase process. The liquid phase process produces zinc oxide by synthesize and precipitate zinc formate, zinc oxide, basic zinc carbonate or the like in a liquid phase, filtering and washing the precipitates, and thermally decomposing them. The liquid phase process can readily give fine primary particles. However, since it includes the steps of liquid phase synthesis, filtering, drying, etc., the zinc oxide obtained thereby must inevitably be aggregates. In practical use, zinc oxide must be slurried together with liquids as in the case of paints, pigments, cosmetics, etc., incorporated in or compounded with other solids as in the case of reinforcing materials for rubbers and plastics, or mixed with other powders as in the case of materials for electronic components. In these cases, the existence of aggregated particles considerably deteriorates the uniformity in composition or dispersibility. It is well known in the art that finer particles have more increased dispersibility. Furthermore, use of ultrafine particles can impart additional properties such as increased ultraviolet-shielding-ability while maintaining the transparency of the material containing them as in the case where they are used in cosmetics. Therefore, pulverization treatment must be performed in order to break the aggregates or obtain fine particles. However, this causes disadvantages upon use in that contamination from the vessel, pulverizing balls, etc. occurs and that the particle size distribution becomes broader. In addition, there is a limitation in making the particles finer so that ultrafine particles cannot be obtained. That is, it is very difficult to obtain ultrafine particulates of highly white zinc oxide by a liquid process.

On the other hand, there is a vapor process as a process for producing zinc oxide powders. The vapor process is to obtain zinc oxide by oxidizing zinc vapor as is well known in so-called French process and U.S. process (See Bull. Chem. Soc. Japan, 837–842, 1984). The U.S. process is a process which includes oxidization of zinc vapor containing a reducing gas and may happen to produce needle-shaped zinc oxide. However, this process has a problem in purity since lead, cadmium, etc. tends to be contained in the product. Furthermore, conglomerate particles tend to be mixed in the product. On the other hand, the French process is a process which produces zinc oxide by oxidizing zinc vapor. It gives zinc oxide in a higher purity than the U.S. process but the zinc oxide is comprised by conglomerate particles and it is difficult to obtain products made simply of needle-shaped particles.

As a method for obtaining tetrapod- or needle-shaped zinc oxide, JP-A-3150299 discloses a production process of zinc oxide whiskers by setting the temperature of the atmosphere in a heat-resistant vessel to a predetermined temperature and slowly cooling the obtained zinc vapor to promote the growth of needle-like crystals. However, the zinc oxide obtained by the process is comprised by relatively large tetrapod-shaped particles having a particle diameter of about 5 $\mu$m to about 80 $\mu$m. There is another problem that the above process is a production process of a batch-type so that it is unsuitable for mass production. Furthermore, JP-A-4-349118 discloses a method for obtaining needle-shaped zinc oxide by adding zinc vapor stepwise along its flow path. However, the particles obtained by the process have a particle size as large as 1 $\mu$m to 20 $\mu$m.

The method for obtaining fine tetrapod-shaped zinc oxide includes a process for obtaining needle-shaped zinc oxide by oxidizing and combusting zinc vapor and cooling the product at a rate of 480° C./sec or more as disclosed in JP-B-6-05529. Even in this case, however, fine particles at best have an average particle size of about 0.2 $\mu$m to about 1 $\mu$m. To make them finer, it could be considered to increase the cooling rate to an extremely high rate. However, this measure results in insufficient oxidation of zinc vapor. As a result, unreacted zinc contaminates the product to color it gray so that it is very difficult to obtain ultrafine particulates of highly white zinc oxide. Furthermore, JP-A-7-118133 discloses the production method for ultrafine particulates of zinc oxide having a BET specific surface area of 70 $m^2/g$ to 110 $m^2/g$. Such extremely ultrafine particles when in use for cosmetics will have decreased ultraviolet-shielding-ability in spite of an increase in the transparency of zinc oxide.

An object of the present invention is to provide fine particles, especially ultrafine particulates of highly white zinc oxide useful as an additive to cosmetics, pigments, paints, etc., particularly the one having a tetrapod- or needle-shaped particle configuration.

Another object of the present invention is to provide a process of producing fine or ultrafine particulates of highly white zinc oxide in a high purity and in a high yield.

Particularly, an object of the present invention is to provide fine or ultrafine particulates of highly white zinc oxide and production process thereof.

SUMMARY OF THE INVENTION

With view to obviating the above problems, the present inventors have made extensive investigations. As a result, they have found that fine or ultrafine particulates of highly white zinc oxide can be obtained that has a specified particle diameter within which the ultraviolet-shielding-ability is high, i.e., a reduced average particle diameter of about 15 nm to about 55 nm as measured by the BET-one point method (JIS R1626) and that has an L value of about 90 or more as measured by a Hunter-type color-difference meter. Also, they have found that for this purpose, the following two conditions must be met simultaneously: (1) zinc vapor is completely oxidized in a short time and (2) the reaction is terminated immediately after the completion of oxidation in order to determine the end point of the oxidation reaction of zinc vapor and avoid the collision and fusion of generated zinc oxide particles. The present invention has been achieved based on the above discoveries.

That is, the present invention relates to fine or ultrafine particulates of highly white zinc oxide having a reduced average particle diameter of about 15 nm to about 55 nm as measured by the BET-one point method and that has an L value of about 90 or more as measured by a Hunter-type color-difference meter, particularly the one having a tetrapod- or needle-shaped particle configuration and to a process for producing ultrafine particulates of highly white zinc oxide characterized by quick and complete oxidation of zinc oxide and inhibition of the growth and aggregation of particles.

According to the present invention, it has been found that to obtain ultrafine particulates of zinc oxide having an L value of about 90 or more as measured by a Hunter-type color-difference meter, it is important to oxidize zinc vapor with an oxidizing gas quickly and completely. To this end, it is found to be very effective to vaporize zinc in a vaporizer and superheat the resulting gas by a heater provided downstream the vaporizer and it is also found to be effective to use a dense silicon carbide ceramic as a material of the heater. After the vaporization of zinc, introduction of the raw material gas into the heater made of a silicon carbide ceramic enables the temperature of the raw material gas upon its discharge into the reactor to efficiently reach such a high temperature as has been never reached conventionally, i.e., as high as about 950° C. or more. Also, a heater made of the same material can be used for the oxidizing gas to sufficiently heat it so that a temperature of about 900° C. or more can be reached at a nozzle for discharging the gas into the reactor. In addition, it has been found that by selecting the composition of the oxidizing gas in a specified range, the raw material gas as heated as described above can be oxidized very uniformly and quickly. The new knowledge on the raw material gas and oxidizing gas has led to very quick and complete oxidation of zinc vapor and as a result, it has been found that ultrafine particulates of highly white zinc oxide can thus be obtained. By enabling such a quick oxidation of zinc vapor, no coloration of product occurs in spite of a decreased length of the reaction part and it has been successful in obtaining ultrafine particulates of highly white zinc oxide having a reduced average particle diameter of about 15 nm to about 55 nm as measured by the BET-one point method and that has an L value of about 90 or more as measured by a Hunter-type color-difference meter, particularly the one having a tetrapod- or needle-shaped particle configuration.

The above and other objects, effects, features and advantages of the present invention will become more apparent from the following description of preferred embodiments with reference to the attached drawings.

BRIEF DESCRIPTION OF THE ATTACHED DRAWING

FIG. 1 is a flow sheet illustrating an example of the arrangement of apparatus used advantageously in producing ultrafine particulates of highly white zinc oxide according to the present invention.

DESCRIPTION OF THE PREFERRED EMBODIMENTS

Hereinafter, the present invention will be described in detail with reference to the attached drawing.

FIG. 1 is a flow sheet illustrating an example of the arrangement of apparatus used advantageously in producing ultrafine particulates of highly white zinc oxide according to the present invention. The arrangement of the apparatus includes a raw material (zinc) feeder 1, a raw material (zinc) vaporizer 2, an inert gas preheater 3, a raw material (zinc) gas heater 4, a nozzle 4A of the raw material gas heater, an oxidizing gas heater 5, a nozzle 5A of the oxidizing gas heater, a reactor 6, an outlet 6A of the reactor, a cooler 7, and a collector 8 for collecting a product.

Metallic zinc (Zn) as a raw material is fed from the raw material feeder 1 and fed to the raw material vaporizer. The shape of zinc fed to the vaporizer 2 may be either powder or wire. It is possible to feed an inert gas along with metallic zinc as a raw material to the raw material vaporizer 2. The inert gas serves as a carrier gas for zinc vapor or as a shield gas for shielding the raw material when it is introduced. The inert gas includes nitrogen, helium, argon, etc. However, it is not limited thereto. It is desirable that the inert gas be heated in advance before it can be introduced. In this case, the inert gas is preheated to a temperature of about 500° C. to about 1,000° C., for example, by the preheater 3 and then fed to the raw material vaporizer 2. The concentration of the inert gas to be introduced into the raw material vaporizer 2 is preferably such that the ratio of the number of moles of Zn to the total number of moles of Zn+inert gas, i.e., Zn/(Zn+inert gas), is in the range of about 3% by mole or more and about 70% by mole or less. This concentration is closely related to the productivity and influences the size of the resulting zinc oxide particles.

Then, zinc vapor containing the inert gas, i.e., raw material gas is introduced from the raw material vaporizer 2 to the raw material gas heater 4. The raw material vaporizer 2 and the raw material gas heater 4 may be integrated. In the raw material gas 4 or the integrated heater constituted by the raw material vaporizer 2 and the raw material gas heater 4, the gas must be heated quickly and sufficiently. This is because if the heating is insufficient and the heater fails to sufficiently serve as a heater, zinc vapor will be liquefied or solidified in the midway to the nozzle 4A of the heater 4 (or integrated heater) or inside the reactor 6 after it is blown thereinto to cause clogging of the system, so that the system cannot be operated safely or zinc oxide of a desired quality cannot be obtained. If no clogging of the system occurred, it is highly possible that the obtained zinc oxide will contain unreacted zinc to give a grayish product.

To obtain ultrafine particles having a reduced average particle diameter of about 15 nm to about 55 nm as measured by the BET-one point method, the temperature of the gas containing zinc vapor at the nozzle 4A of the raw material gas heater 4 must be about 950° C. or more, preferably about 1,000° C. or more. If the temperature is below about 950° C., the oxidation occurs insufficiently and a longer residence time will be necessary in order to effect sufficient oxidation, with the result that fine particles tend to grow or collision and fusion of fine particles with each other tends to occur. As a result, desired ultrafine particles of zinc oxide are difficult to obtain. On the other hand, the higher the temperature is, the more quickly and completely the oxidation will proceed so that uniformity and dispersibility of the product are improved. Therefore, heaters made of glass or ceramic are suitable for realizing sufficient heating. Particularly, it is preferred to use a heater made of silicon carbide ceramic. This is because silicon carbide ceramics are particularly high in coefficient of thermal conductivity among various materials resistant to heat, silicon carbide is dark gray in color and hence has high absorptivity and high emissivity and so on so that heat can be supplied to the gas with ease. As described above, higher temperatures of the gas containing zinc vapor at the nozzle 4A are preferred. However, it is practically about 1,150° C. or less since the heat resistant material which constitutes the raw material gas heater 4 is limited with respect to heat resistance and coefficient of thermal conductivity. Of course, improvement in the thermal resistance of the conducting material which constitutes the raw material heater 4 will enable use of temperatures higher than the above-described temperature.

Furthermore, filling thermal-conducting media in the heater 4 can promote conduction of heat to the raw material gas more efficiently. As the thermal-conducting media, heat resistant materials such as ceramics and glass, particularly quartz, silicon carbide ceramic are preferred. In view of the efficiency of heat conduction, it is preferred that thermal-conducting media be in the shape of a ring, a mesh ring, a honeycomb, a Raschig ring or the like. The filling amount of thermal-conducting media may be as much as possible unless the heater will not be damaged due to thermal expansion of the media.

The diameter (inner diameter) and length of the heater are determined such that the temperature of the raw material gas at the nozzle of the raw material gas heater 4 is about 950° C. or more, preferably about 1,000° C. or more. However, the present invention is not limited thereto. Use of silicon carbide ceramics can considerably reduce the size of the heater 4 as compared with the use of alumina tubes and realize heating as high as about 1,200° C.

The gas containing zinc vapor thus heated is then introduced into the reactor 6. On the other hand, the oxidizing gas which oxidizes zinc is heated by the oxidizing gas heater 5 and introduced into the reactor 6. The structure of the oxidizing gas heater 5 is not particularly limited as far as it allows sufficient heating but it is preferred that the heater 5 be of the same structure as the raw material gas heater 4.

The oxidizing gas must be at a temperature of about 900° C. or more, preferably about 1,000° C. or more at the nozzle 5A of the oxidizing gas heater 5. This is because if the temperature of it is lower than about 900° C., the oxidizing gas will cool the raw material upon their contact, resulting in liquefaction or solidification of zinc vapor as the raw material. Thus, it is preferred that the temperature of the oxidizing gas be elevated depending on the temperature of the gas containing zinc vapor as the raw material gas.

The use amount of the oxidizing gas is about 1.2 times or more and about 150 times or less, preferably about 50 times or more and about 100 times ore less, the theoretical amount of it required for the oxidation of zinc vapor. The oxidizing gas must be comprised by about 10% by volume or more and 100% by volume or less of oxygen and 0% by volume or more and about 90% by volume or less of steam provided that the sum of oxygen and steam is about 10% by volume or more and 100% by volume or less. Steam is added because the addition of steam to the oxidizing gas is found to be effective to considerably accelerate the oxidation by the oxidizing gas.

When the raw material gas and oxidizing gas are in the above temperature range, the oxidation will proceed quickly no matter whatever is like the manner in which they are blown, such as a coaxial parallel flow, an oblique flow or a cross flow. The nozzles 4A and 5A are preferably coaxial parallel flow nozzles, respectively. As the coaxial parallel flow nozzle, use is made of a double wall pipe or a triple wall pipe. The size of the reactor 6 and blowing rates of the raw material gas and of the oxidizing gas are determined such that the retention time of the gas expressed in normal temperature and pressure in the reaction part is about 0.1 second or less, preferably about 0.05 second or less. Here, the retention time expressed in normal temperature and pressure is calculated from the flow rate of the gas which passes through the reactor 6 after the blowing and the volume of the reactor 6.

The reactor 6 may be of any shape but a cylindrical one is advantageous from the viewpoint of, for example, preventing the adhesion of scales on the inside thereof. The material of the reactor 6 is selected taking into consideration the heat resistance thereof upon the oxidation reaction of zinc vapor and its resistance to corrosion by zinc and so on. It is advantageous from the viewpoints of cost and maintenance to use a cylindrical pipe made of a stainless-steel equipped with water cooling jacket or the like apparatus.

The oxidation reaction of zinc vapor proceeds inside the reactor 6 and it is necessary to rapidly cool the reaction gas mixture at a predetermined site in order to control the retention time so that aggregation growth and/or collision of ultrafine particles. More particularly, there is taken a measure of introducing a gas for cooling the reaction gas mixture immediately after the outlet 6A of the reactor 6 or some other means suitable for this purpose. As the cooling gas, air, nitrogen, etc. can be used. The cooling gas is blown so that the average gas temperature immediately after the outlet 6A of the reactor 6 is about 100° C. or more and about 450° C. or less. The temperature of about 450° C. or less is the temperature at which it was confirmed that no temperature-dependent aggregation growth of ultrafine particles of zinc oxide generated in the reactor 6 occurred. Accordingly, lower temperatures are better for rapid cooling. However, the above temperature range is preferred because a large amount of cooling gas is needed when the temperature is low and for the purpose of preventing dropwise condensation of moisture in the gas. The zinc oxide thus obtained is collected by the product collector 8 such as a bag filter. Adjusting the temperature of gas to be blown and retention time in the reactor can control the reduced average particle diameter of zinc oxide. Higher temperatures of the gas to be blown and/or shorter retention time results in smaller average particle diameter of zinc oxide.

By the production conditions and arrange of apparatus as described above, ultrafine particulates of highly white zinc oxide having a reduced average particle diameter of about 15 nm to about 55 nm as measured by the BET-one point method and that has an L value of about 90 or more as measured by a Hunter-type color-difference meter, preferably the one having a tetrapod- or needle-shaped particle configuration, can be obtained.

EXAMPLES

Hereinafter, the present invention will be described in detail by examples and comparative examples. However, the present invention should not be construed as being limited to the examples.

Example 1

Two (2) kg/hr of metallic zinc and 8 Nm$^3$/hr (N means normal temperature and pressure, i.e., 25° C., 760 mmHg, hereinafter the same) of nitrogen gas heated at 900° C. were simultaneously fed to a raw material vaporizer. The gas containing zinc vapor from the raw material vaporizer was introduced into a heater made of a dense silicon carbide ceramic having a density of 3.1 g/cm$^3$ and a SiC purity of 99.8%. The heater was of an external heating type and filled with silicon carbide ceramic blocks of the same material as the heater. The retention time of gas in the heater was 7 seconds (calculation was made assuming that the gas was at normal temperature and pressure as stated above). The temperature of the gas obtained here was 1,000° C. at the nozzle in the reactor. On the other hand, a total 25 Nm$^3$/Hr of 5% by volume of steam and 95% by volume of oxygen was heated in the heater of an external heating type. The heater was made of a dense silicon carbide ceramic having a density of 3.1 g/cm$^3$ and a SiC purity of 99.8%. Also in the heater, the silicon carbide ceramic blocks of the same material as the raw material gas heater were filled. Thus, the temperature of the gas at the nozzle in the reactor was 1,030° C. The manner in which the both gases were spouted was coaxial parallel flow. The average retention time of gas in the reactor was 0.02 second and the gas temperature was adjusted to be 300° C. or less by blowing air at room temperature immediately after the outlet of the reactor. Thereafter, zinc oxide collected in a bag filter was in the form of tetrapod-shaped ultrafine particulates of highly white zinc oxide containing needle-shaped zinc oxide, having an L value of 96 as measured by a Hunter-type color-difference meter and a reduced average particle diameter of 24 nm as measured by the BET-one point method.

Example 2

Two (2) kg/hr of metallic zinc and 8 Nm$^3$/hr of nitrogen gas heated at 900° C. were simultaneously fed to a raw material vaporizer. The gas containing zinc vapor from the raw material vaporizer was introduced into a heater made of a dense silicon carbide ceramic having a density of 3.1 g/cm$^3$ and a SiC purity of 99.8%. The heater was of an external heating type and filled with silicon carbide ceramic blocks of the same material as the heater. The retention time of gas in the heater was 7 seconds (calculation was made assuming that the gas was at normal temperature and pressure as stated above). The temperature of the gas obtained here was 1,000° C. at the nozzle in the reactor. On the other hand, a total 25 Nm$^3$/Hr of 5% by volume of steam and 95% by volume of oxygen was heated in the heater of an external heating type. The heater was made of a dense silicon carbide ceramic having a density of 3.1 g/cm$^3$ and a SiC purity of 99.8%. Also in the heater, the silicon carbide ceramic blocks of the same material as the raw material gas heater were filled. Thus, the temperature of the gas at the nozzle in the reactor was 1,030° C. The manner in which the both gases were spouted was coaxial parallel flow. The average retention time of gas in the reactor was 0.008 second and the gas temperature was adjusted to be 300° C. or less by blowing air at room temperature immediately after the outlet of the reactor. Thereafter, zinc oxide collected in a bag filter was in the form of tetrapod-shaped ultrafine particulates of highly white zinc oxide containing needle-shaped zinc oxide, having an L value of 95 as measured by a Hunter-type color-difference meter and a reduced average particle diameter of 17 nm as measured by the BET-one point method.

Example 3

Five (5) kg/hr of metallic zinc and 14 Nm$^3$/hr of nitrogen gas heated at 900° C. were simultaneously fed to a raw material vaporizer. The gas containing zinc vapor from the raw material vaporizer was introduced into a heater made of a dense silicon carbide ceramic having a density of 3.1 g/cm$^3$ and a SiC purity of 99.8%. The heater was of an external heating type and filled with silicon carbide ceramic blocks of the same material as the heater. The retention time of gas in the heater was 5 seconds (calculation was made assuming that the gas was at normal temperature and pressure as stated above). The temperature of the gas obtained here was 1,000° C. at the nozzle in the reactor. On the other hand, a total 33 Nm$^3$/Hr of 4% by volume of steam and 96% by volume of oxygen was heated in the heater of an external heating type. The heater was made of a dense silicon carbide ceramic having a density of 3.1 g/cm$^3$ and a SiC purity of 99.8%. Also in the heater, the silicon carbide ceramic blocks of the same material as the raw material gas heater were filled. Thus, the temperature of the gas at the nozzle in the reactor was 980° C. The manner in which the both gases were spouted was coaxial parallel flow. The average retention time of gas in the reactor was 0.02 second and the gas temperature was adjusted to be 300° C. or less by blowing air at room temperature immediately after the outlet of the reactor. Thereafter, zinc oxide collected in a bag filter was in the form of tetrapod-shaped ultrafine particulates of highly white zinc oxide containing needle-shaped zinc oxide, having an L value of 94 as measured by a Hunter-type color-difference meter and a reduced average particle diameter of 40 nm as measured by the BET-one point method.

Comparative Example 1

Two (2) kg/hr of metallic zinc and 8 Nm$^3$/hr of nitrogen gas heated at 900° C. were simultaneously fed to a raw material vaporizer. The gas containing zinc vapor from the raw material vaporizer was directly spouted into a reactor. The gas temperature at the nozzle of the vaporizer was 800° C. On the other hand, 25 Nm$^3$/hr of oxygen gas was heated in a heater of an external heating type. The heater was made of quartz and filled with quartz blocks. The temperature of heated gas was 990° C. at the nozzle in the reactor. The manner in which the both gases were spouted was coaxial parallel flow. The average retention time of gas in the reactor was 3 seconds and the gas temperature was adjusted to be 300° C. or less by blowing air at room temperature immediately after the outlet of the reactor. Thereafter, zinc oxide collected in a bag filter was in the form of fine particulates of zinc oxide having an L value of 95 as measured by a Hunter-type color-difference meter and a reduced average particle diameter of 135 nm as measured by the BET-one point method.

Comparative Example 2

Two (2) kg/hr of metallic zinc and 8 Nm$^3$/hr of nitrogen gas heated at 900° C. were simultaneously fed to a raw material vaporizer. The gas containing zinc vapor from the raw material vaporizer was directly spouted into a reactor. The gas temperature at the nozzle of the vaporizer was 800° C. On the other hand, 25 Nm$^3$/hr of oxygen gas was heated in a heater of an external heating type. The heater was made of quartz and filled with quartz blocks. The temperature of heated gas was 990° C. at the nozzle in the reactor. The manner in which the both gases were spouted was coaxial parallel flow. The average retention time of gas in the reactor was 2.1 seconds and the gas temperature was adjusted to be 300° C. or less by blowing air at room temperature immediately after the outlet of the reactor. Thereafter, zinc oxide collected in a bag filter was in the form of fine particulates of zinc oxide having an L value of 87 as measured by a Hunter-type color-difference meter and a reduced average particle diameter of 90 nm as measured by the BET-one point method.

Comparative Example 3

Five (5) kg/hr of metallic zinc and 14 Nm$^3$/hr of nitrogen gas heated at 900° C. were simultaneously fed to a raw material vaporizer. The gas containing zinc vapor from the raw material vaporizer was directly spouted into a reactor. The gas temperature at the nozzle of the vaporizer was 750° C. On the other hand, 33 Nm$^3$/hr of oxygen gas was heated in a heater of an external heating type. The heater was made of quartz and filled with quartz blocks. The temperature of heated gas was 980° C. at the nozzle in the reactor. The manner in which the both gases were spouted was coaxial parallel flow. The average retention time of gas in the reactor was 1.8 seconds and the gas temperature was adjusted to be 300° C. or less by blowing air at room temperature immediately after the outlet of the reactor. Thereafter, zinc oxide collected in a bag filter was in the form of fine particulates of zinc oxide having an L value of 85 as measured by a Hunter-type color-difference meter and a reduced average particle diameter of 65 nm as measured by the BET-one point method.

The zinc oxide of the present invention is high purity fine particulates, especially ultrafine particulates that have not been subjected to the step of pulverization. Because of its small average particle diameter, the zinc oxide has very high dispersibility in aqueous solutions, resins, etc. and tends to form uniform mixture. When used in cosmetics, etc., it improves the feeling upon use. Also, because of its high degree of whiteness, adjustment of color can be performed with ease when it is suspended or kneaded with other substances. The present invention provides a production process for such fine or ultrafine particulates of highly white zinc oxide on an industrial scale continuously and with constant quality so that it finds very high practical value in industry.

The invention may be embodied in other specific forms without departing from the spirit or essential characteristics thereof. Therefore, the present embodiment is to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. Ultrafine particulates of white zinc oxide having a high degree of whiteness and a reduced average particle diameter of about 15 nm to about 55 nm as measured by the BET-one point method and which have an L value of about 90 or more as measured by a Hunter color-difference meter.

2. The ultrafine particulates of white zinc oxide having a high degree of whiteness as claimed in claim 1, wherein said ultrafine particulates have a tetrapod- or needle-shaped particle configuration.

3. A process for producing ultrafine particulates of white zinc oxide having a high degree of whiteness, comprising oxidizing zinc vapor with an oxidizing gas in a reactor, wherein a zinc vapor-containing gas has a temperature of about 950° C. or more at a nozzle of the reactor for discharging the zinc vapor-containing gas and the oxidizing gas has a temperature of about 900° C. or more at a nozzle of the reactor for discharging the oxidizing gas.

4. The process for producing ultrafine particulates of white zinc oxide having a high degree of whiteness as claimed in claim 3, wherein the amount of the oxidizing gas discharged into the reactor is about 1.2 times or more and about 150 times or less than a theoretical amount of the oxidizing gas required for oxidizing the zinc vapor.

5. The process for producing ultrafine particulates of white zinc oxide having a high degree of whiteness according to claim 3 or 4, wherein the oxidizing gas discharged into the reactor has a composition composed of about 10% by volume or more and 100% by volume or less of oxygen and 0% by volume or more and about 90% by volume or less of steam provided that the sum of oxygen and steam is about 10% by volume or more and 100% by volume or less.

6. The process for producing ultrafine particulates of white zinc oxide having a high degree of whiteness according to claim 3, wherein a residence time of the gas passing the reactor is about 0.1 second or less as expressed in standard temperature and pressure (0° C. and 1 atm (760 mmHg)).

7. The process for producing ultrafine particulates of white zinc oxide having a high degree of whiteness according to claim 3, wherein a cooling gas is blown against an effluent gas immediately after an outlet of the reactor to maintain an average temperature of the effluent gas immediately after the outlet of the reactor at about 100° C. or more and about 450° C. or less.

8. The process for producing ultrafine particulates of white zinc oxide having a high degree of whiteness according to claim 3, wherein a heater is provided downstream of a zinc vaporizer so that the temperature of the gas obtaining zinc vapor at the nozzle for discharging it is maintained at about 950° C. or more.

9. The process for producing ultrafine particulates of white zinc oxide having a high degree of whiteness according to any one of claims 3–7, wherein the heater and the zinc vaporizer are made of a dense silicon carbide ceramic.

* * * * *